Oct. 28, 1924.                                                                      1,513,519
H. C. PRIEBE
CAR TRUCK EQUIPPED WITH BRAKES
Filed July 23, 1921
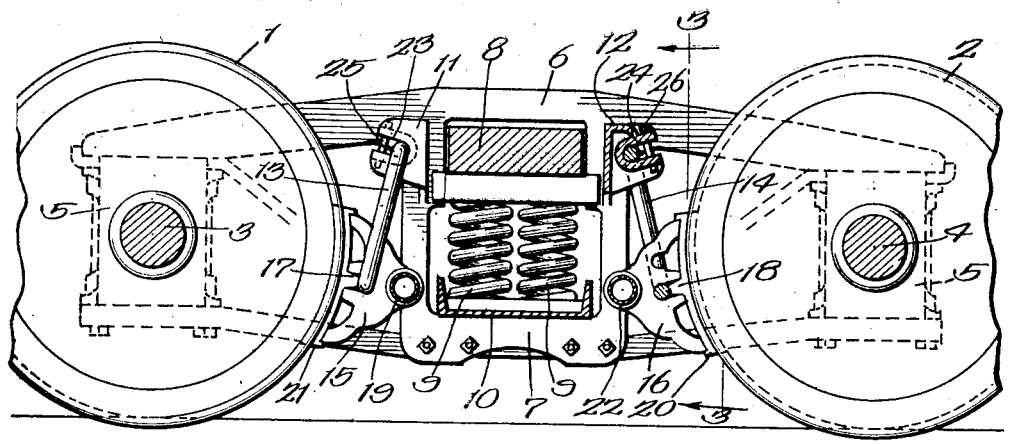
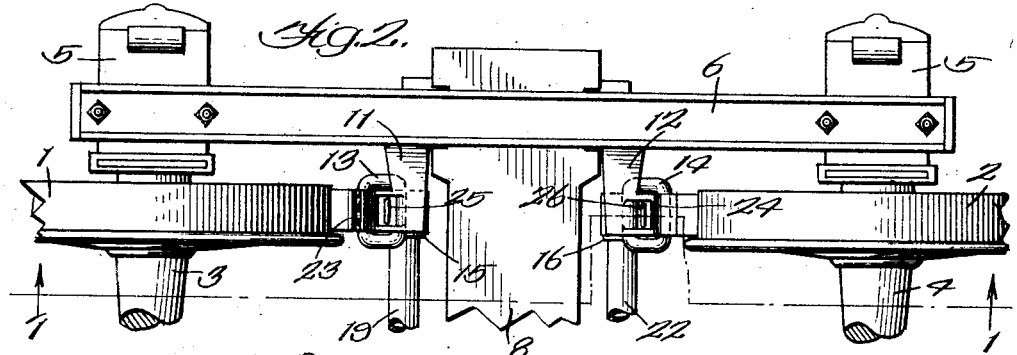
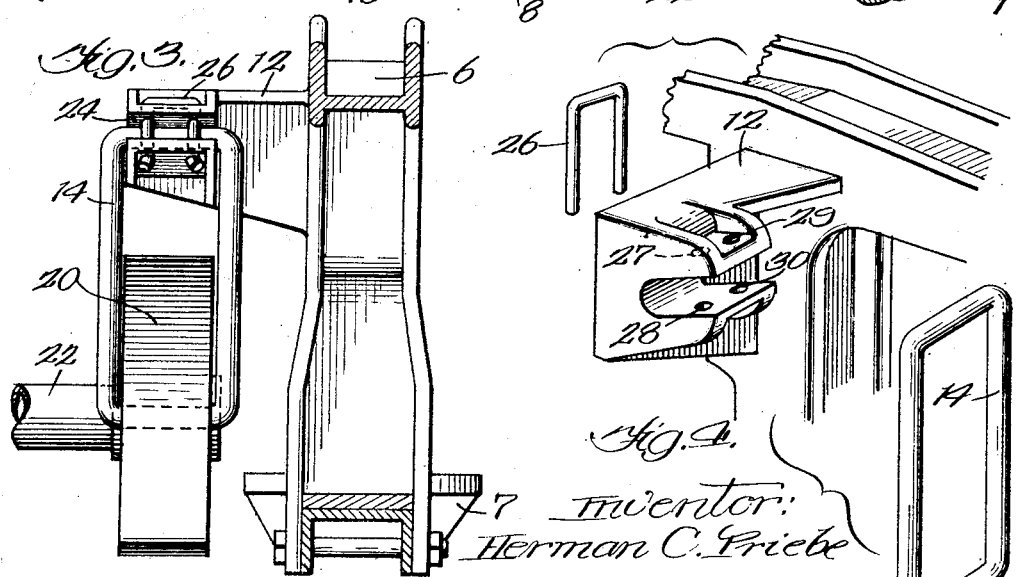
Inventor:
Herman C. Priebe Patented Oct. 28, 1924.

1,513,519

UNITED STATES PATENT OFFICE.

HERMAN C. PRIEBE, OF BLUE ISLAND, ILLINOIS.

CAR TRUCK EQUIPPED WITH BRAKES.

Application filed July 23, 1921. Serial No. 487,171.

*To all whom it may concern:*

Be it known that I, HERMAN C. PRIEBE, citizen of the United States, residing at Blue Island, in the county of Cook and State of Illinois, have invented a certain new and uesful Improvement in Car Trucks Equipped with Brakes, of which the following is a full, clear, concise, and exact description.

My invention relates to car trucks whose side frames carry brake shoes and the brake beams that connect the brake shoes, and has for its object the provision of an improved assembly of the car truck side frames with the braking equipment whereby this equipment may readily be assembled with the car truck and readily removed from such assembly without any special adjustment of any part of the car truck or the wheels upon which the same is supported.

In carrying out my invention hangers are employed which are hollow, being usually formed of iron rod enclosing rectangular or other spaces. Each brake head at each end of the corresponding brake beam is assembled with the lower end of a hanger, such assembly being maintained by the brake shoe on the brake head. The upper end of each hanger is assembled with a side frame of the truck which, for the purpose, is equipped with a brake hanger carrier. In a four wheel truck there two brake hangers thus mounted in conjunction with each pair of wheels. The brake hanger carriers associated with the two pairs of wheels are symmetrically related and the hangers carried thereby are also symmetrically related as are the corresponding brake heads, brake beams, and brake shoes. The brake hanger carriers are provided with slots which open, respectively, toward the ends of the truck, the sides of these slots being perpendicular to the normal position of the brake hangers, these brake hangers coinciding in direction with the directions of the brake thrusts or strains. By thus positioning the slots at right angles to the brake hangers and the direction of braking strains, the hangers, under braking strains, when moved forcibly against the top side of said slots or the bottom sides of the slots, are not apt to be moved along the slots. This enables me to employ simple closure devices or keepers for the outer, open, ends of the slots simply to assure maintenance of assembly of the hangers with their carriers in the absence of braking strains, these closure devices thus serving to maintain the hangers in position to transmit braking strains to the carriers in either direction in which such strains are manifested. In assembling the hangers the closures for the slots are removed to permit of the ready insertion of the upper portions of the hangers in the slots and in order to disassemble the hangers the slot closure devices need merely be removed, whereafter the hangers may be dislodged, the assembling of the hangers with the trucks and the disassembly of the hangers and trucks being accomplished without any adjustment of the members of the trucks or the wheels upon which the trucks are carried. While I prefer the form of slots in the carriers which have been described, I do not wish to be limited to such form in all embodiments of the invention.

I will explain my invention more fully by reference to the accompanying drawing in which Fig. 1 is a view in elevation taken on line 1—1 of Fig. 2.; Fig. 2 is a plan view of one side of a truck with the brake hangers supported thereon in accordance with the invention; Fig. 3 is a sectional view on line 3—3 of Fig. 1; and Fig. 4 is a perspective view illustrating the brake hanger, the carrier therefor, and a slot closure key in separated relation.

Like parts are indicated by similar characters of reference throughout the different figures.

The drawing shows a two wheel portion of a four wheel truck, the car wheels 1 and 2 being respectively upon ends of axles 3 and 4 whose other ends have similar wheels thereon. A car axle box 5 is supported upon each end of each axle.

The top or head 6 of the T-shaped cast iron or steel side frame is of any usual or suitable formation. The stem 7 of each T-shaped cast iron or steel side frame is formed as preferred, the stem illustrated being hollow to receive the truck bolster 8 and the upright coiled springs 9 upon which the truck bolster is supported and which themselves are supported by the bottom side of the hollow T-stem 7, a channel iron 10 being preferably interposed between the lower ends of the springs and the bottom side of the hollow T-stem, all in accordance with common practice, these characteristics forming no essential part of my invention. The upper portions of each side frame are equipped with inwardly extending brake hanger carriers 11, 12, the carriers 11 being each individual to one of the wheels 1 of the pair upon the axle 3 and the carriers 12 being each individual to one of the wheels 2 of the pair upon the axle 4. Brake hangers 13 and 14, in the form of hollow links, are assembled with the brake hanger carriers at the upper end of the brake hangers and the brake heads 15 and 16 at the lower ends of the hangers. The assembly of the brake heads and the hangers, once having been effected, is maintained by the lugs 17, 18 upon the brake shoes 20, 21 in accordance with common practice. The brake hangers being thus assembled with the brake heads are, through the intermediation of such brake heads, assembled with the brake beams 19 and 22 that respectively connect the brake heads 15 that pertain to the wheels 1 of a pair and the brake heads 16 that pertain to the wheels 2 of the other pair. The brake hangers are so assembled with the brake heads and the brake hanger carriers that such hangers will coincide in direction to the braking strains transmitted therethrough. These brake hangers are preferably hollow, being desirably formed of suitably heavy iron rod which is bent to enclose a rectangular or other suitable space and whose abutting ends are welded to constitute closed rings of the hangers. Hitherto complicated expedients have been resorted to to include said closed rings in assembly with the brake heads and brake hanger carriers. I avoid this complication by the simple expedient of forming slots 23, 24 in the hangers 11 and 12, the slots 23 in the hanger 11 that face the wheels 1 of a pair being directed toward these wheels and being open or adapted to be opened at the ends thereof adjacent these wheels, the slots 24 in the hanger 12 that face the wheels 2 of the other pair being directed toward these latter wheels and being open or adapted to be opened at the ends thereof adjacent these wheels. Each of these slots has substantially parallel sides which are substantially perpendicular to the plane of the corresponding hangers so that whether said hangers are pulled downwardly upon or are thrust upwardly upon in the braking operations the braking thrusts are transmitted through the hangers substantially at right angles to the slot walls engaged thereby so that such hangers will not creep outwardly along such slots. The U-shaped keys or closures 25 and 26 are passed through suitable openings (numbered 27, 28, 29 and 30 in Fig. 4) which are at the outer ends of corresponding carriers, these openings being positioned at the open ends of the slots so that the keys or closures 25 will normally close the slots after the hangers have been inserted therein. The keys or closures are spaced apart from the hangers to afford working clearance.

Hangers thus supported are not moved outwardly where assembled with the carriers when being subject to braking strains. The staple form of key or closure 25, illustrated in the drawing, is preferred, though the invention is not to be limited to any particular form of key or closure.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

The combination with the side frames of a car truck; of pairs of car wheels supporting said side frames; a brake hanger carrier upon each side frame, one of these carriers being contiguous to each one of the wheels and formed with slots opening toward said wheels; brake hangers, in the form of hollow links, having their upper sides in said slots; brake heads with which the lower sides of the hangers are assembled; brake shoes upon said brake heads; a brake beam uniting the brake heads; and closures for the open ends of said slots and in the form of U-shaped keys whose sides are received in the parts in which said slots are formed, said brake hangers being substantially coincident in direction with the direction of the braking strains impressed thereupon while the sides of said slots are substantially perpendicular to the brake hangers.

In witness whereof, I hereunto subscribe my name this thirteenth day of June, A. D., 1921.

HERMAN C. PRIEBE.